UNITED STATES PATENT OFFICE.

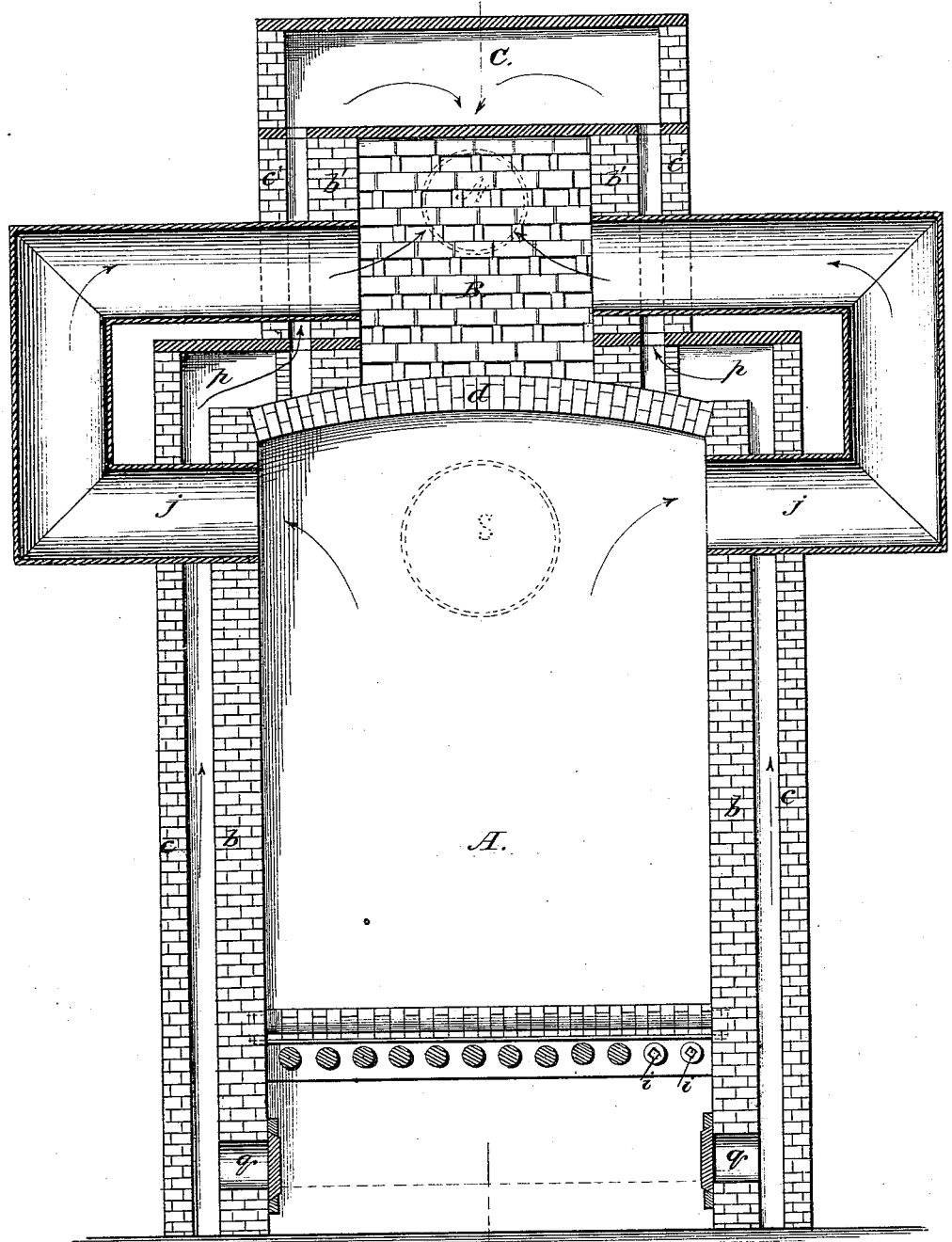

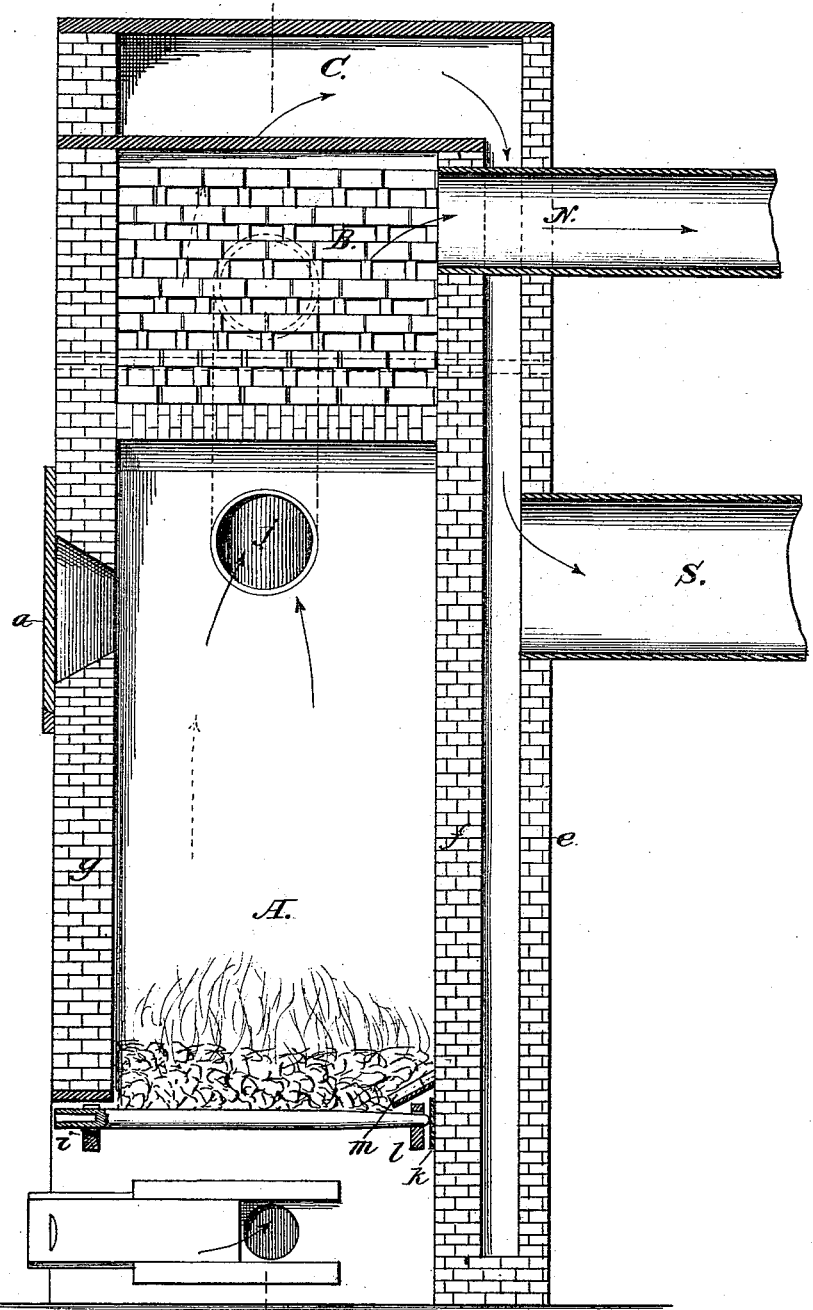

JOHN M. AYER, OF CHICAGO, ILLINOIS.

IMPROVEMENT IN APPARATUS FOR MANUFACTURING HEATING-GAS.

Specification forming part of Letters Patent No. 167,491, dated September 7, 1875; application filed August 25, 1875.

*To all whom it may concern:*

Be it known that I, JOHN M. AYER, of Chicago, in the county of Cook and State of Illinois, have invented certain new and useful Improvements in Apparatus for Manufacturing Heating-Gas; and I do hereby declare that the following is a full, clear, and exact description thereof, which will enable others skilled in the art to which it appertains to make and use the same, reference being had to the accompanying drawings and to the letters of reference marked thereon, which form a part of this specification.

This invention relates to apparatus for the manufacture of a gas to be used wherever high degrees of heat are required—as, for example, in the smelting, heating, and general reduction of metals; and the invention consists in a simple, compact, and comparatively cheap apparatus or furnace, wherein the products of combustion generated are reheated, and the atmospheric air, which is subsequently to be mixed with them to form a combustible or burning gas of great heating-power, is raised to a high temperature. The invention also consists in a new form of grate, whereby the grate or each bar may be readily relieved from clinker, ash, or other formation or residuum without removing the bars from their bearings.

In the accompanying drawings forming part of this specification, Figure 1 is a longitudinal section of the apparatus, taken on line 3 4 of Fig. 2. Fig. 2 is a transverse section taken on line 1 2 of Fig. 1.

A is a generating-chamber, covered by an arch or plate, $d$, and having double or hollow side walls $b\ c$, a double rear wall, $e\ f$, and a solid front wall, $g$. The walls or the arch, either or both, may be of brick or iron, or of any material capable of resisting heat. At the bottom of the generating-chamber is the grate, the bars of which, $i\ i$, are cast round, and with a square opening or barrel on the outer end, extending in about six inches, or with a projection. K is a back plate, against which the bars press after passing through the bearing-bar $l$. The object of making each bar taper toward the back plate is that as little friction-surface may be presented against the plate as possible. $m$ is an inclined plate resting upon the bearing-bar, and, being covered by fire-bricks, protects the bearing-bar from injury by heat.

To free any bar from clinker a key is inserted into the barrel, and the bar is oscillated or rotated. As the bar is round the superincumbent pressure and consequent friction of the fuel will cause it to clean itself.

$j\ j$ are flues, of metal, brick, or other material, capable of resisting high heat, through which the products of combustion from the generating-chamber pass into the regenerator B, and out through the pipe N. This regenerator is directly over the chamber A, and is highly heated from it through the arch $d$. It has double side walls $b'\ c'$, and a back wall, which is a continuation of that of the generating-chamber A. $n$ is a flue leading from the regenerator to the fire-cell or elsewhere, where it may be desirable to lead the products of combustion. $q\ q$ are air-flues directly under the grate, opened and closed by suitable slides or doors, and leading into the air-spaces between the side walls $b\ c$. Atmospheric air entering through the flues $q\ q$ passes upward through the spaces between the side walls $b\ c$ into chambers $p$. These chambers $p$ are more highly heated than the spaces just mentioned, in consequence of the line of draft being directed toward them within the generating-chamber. From the chambers $p$ the heated air passes upward through a space between the walls $b'\ c'$ of the regenerator into a chamber, C, which is located above the regenerator, and, being heated by the same, becomes a superheating-chamber. From the chamber C the heated air passes downward in the direction of the natural draft, as indicated by the arrows, into the space between the double back wall $e\ f$, and out through the flues S, in order to be mingled with the products of combustion in any manner or at any suitable place where it may be desirable to secure combustion or use a heating-gas.

The operation of this device is as follows: Fuel being charged into the generating-chamber through the stock-hole, a smoldering combustion takes place upon the grate-bars by reason of the draft being but slight, having to pass through the fuel. The products of combustion from the generating-chamber pass through the pipes $j$, recover what heat they may have lost in their passage through these pipes in the regenerating-chamber B, and, leaving the regenerating-chamber, pass through the pipe $n$ into any chamber where it is desirable to produce a high degree of heat by combustion. I prefer to use my apparatus in the manufacture of iron, and, therefore, I generally have the pipe $n$ open into the fire-cell or combustion-chamber of a reducing, heating, or puddling furnace.

When the walls of the generating-chamber have become heated, or sooner, if desired, the slides or doors closing the air-flues $q$ are opened. Atmospheric air from immediately under the grate, where it is hottest, then passes through these flues in the direction of the arrows into the chambers $p$, thence into the chamber C, and having become highly heated in its passage finally leaves the apparatus by means of the pipe S. The pipe S may, like the pipe $n$, open directly into the fire-cell, or it may open beneath the grate-bars. The latter I deem preferable. Instead of the pipe or flue $n$ opening directly into the fire-cell, in some cases, as where I use the improved form of furnace, for which I intend to make separate application for Letters Patent, I have it open into a chamber behind the fire-cell. This chamber then communicates with the fire-cell by numerous holes or flues. The pipe S might still open into the ash pit or space corresponding with that beneath the grate-bars, or it might open with the pipe $n$ into the extra chamber behind the fire-cell.

Having thus fully described my invention, what I claim, and desire to secure by Letters Patent, is—

1. The combination of a generating-chamber and a regenerator, located above and heated by the same, as set forth.

2. The combination of chambers A, flues $j$, regenerator B, and exit-pipe N, as as and for the purpose described.

3. The air-flues, located immediately below the grate, in combination with the hollow wall and chamber C, as and for the purpose described.

4. In combination with the generating-chamber A, the chambers $p$ C, and intermediate passages between the side and back walls for heating the air, as described.

5. In combination with the chamber A, flue $j$, regenerator B, and exit-flue $n$, the air-heating device described, and exit-flue S.

6. The grate-bars $i\ i$, cast round and with a square barrel, whereby each bar may be turned completely around, as and for the purpose described.

7. The combination of the grate-bars $i\ i$, the bearing-bar $l$, and the back-plate K, as set forth.

8. The combination of the grate-bars $i$, the bearing, and the inclined shield or plate $m$, for the purpose described.

9. A gas-generating apparatus, in which the products of combustion are regenerated, and the air to form a combustible gas with them is heated directly by means of the generating-chamber, all as described.

10. The generating-furnace, having hollow or double walls and chambers, whereby the heat of the furnace is utilized to heat air in its passage between the walls, as set forth.

In testimony that I claim the foregoing as my own, I affix my signature in presence of two witnesses.

JOHN M. AYER.

Witnesses:
THOMAS C. CONNOLLY,
HENRY H. BURTON.